(12) United States Patent
Usami

(10) Patent No.: US 12,423,433 B2
(45) Date of Patent: Sep. 23, 2025

(54) INFORMATION PROCESSING APPARATUS AND METHOD FOR CONTROLLING THE SAME

(71) Applicant: CANON KABUSHIKI KAISHA, Tokyo (JP)

(72) Inventor: Kenta Usami, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 399 days.

(21) Appl. No.: 18/153,548

(22) Filed: Jan. 12, 2023

(65) Prior Publication Data

US 2023/0229780 A1 Jul. 20, 2023

(30) Foreign Application Priority Data

Jan. 19, 2022 (JP) ................. 2022-006224

(51) Int. Cl.
    *G06F 21/57* (2013.01)
(52) U.S. Cl.
    CPC ...... *G06F 21/575* (2013.01); *G06F 2221/033* (2013.01)
(58) Field of Classification Search
    CPC ................ G06F 2221/033; G06F 21/575
    USPC ....................................... 726/26
    See application file for complete search history.

(56) References Cited

U.S. PATENT DOCUMENTS

| | | | |
|---|---|---|---|
| 6,754,818 B1 * | 6/2004 | Lee ................. | G06F 9/4406 713/1 |
| 6,978,363 B2 * | 12/2005 | Larvoire ............ | G06F 9/441 713/1 |
| 8,006,125 B1 * | 8/2011 | Meng ................. | G06F 11/1417 714/6.2 |
| 10,740,468 B2 * | 8/2020 | Shivanna ............. | G06F 21/577 |
| 11,520,894 B2 * | 12/2022 | Jeansonne ............ | G06F 9/4406 |
| 2005/0273588 A1 * | 12/2005 | Ong .................... | G06F 11/1417 713/2 |
| 2007/0073978 A1 * | 3/2007 | Lee .................... | G06F 11/1417 714/E11.135 |
| 2009/0063840 A1 * | 3/2009 | Ogawa ............... | G06F 11/1417 713/2 |
| 2009/0138754 A1 * | 5/2009 | Edwards ............. | G06F 9/4403 714/768 |
| 2010/0245442 A1 * | 9/2010 | Kasai ................ | B41J 2/2142 347/14 |
| 2014/0089615 A1 * | 3/2014 | Watanabe ........... | G06F 3/0619 711/162 |
| 2014/0136826 A1 * | 5/2014 | Paek ................... | G06F 8/65 713/1 |
| 2015/0046717 A1 * | 2/2015 | Hagiwara .......... | G06F 21/575 713/187 |

(Continued)

FOREIGN PATENT DOCUMENTS

JP 2003288213 A 10/2003

OTHER PUBLICATIONS

Franz-Josef Streit* Secure Boot from Non-Volatile Memory for Programmable SoC Architectures; arXiv; year:2020; pp. 1-9.*

*Primary Examiner* — Monjur Rahim
(74) *Attorney, Agent, or Firm* — Canon U.S.A., Inc. IP Division

(57) ABSTRACT

A second processor verifies validity of at least a first boot program using a verification program, and a first processor executes a selection program to select a boot program verified as valid by the second processor, and executes the selected program.

13 Claims, 8 Drawing Sheets

(56) References Cited

U.S. PATENT DOCUMENTS

| | | | | |
|---|---|---|---|---|
| 2015/0089293 | A1* | 3/2015 | Waechter | G06F 11/1417 |
| | | | | 714/36 |
| 2015/0286823 | A1* | 10/2015 | Elnekaveh | H04L 9/3242 |
| | | | | 713/2 |
| 2016/0216978 | A1* | 7/2016 | Dangy-Caye | G06F 11/1433 |
| 2017/0060453 | A1* | 3/2017 | Kodera | G06F 3/0617 |
| 2018/0096154 | A1* | 4/2018 | Shivanna | G06F 21/572 |
| 2019/0005245 | A1* | 1/2019 | Laffey | G06F 3/0632 |
| 2020/0310821 | A1* | 10/2020 | Michishita | G06F 9/4401 |

* cited by examiner

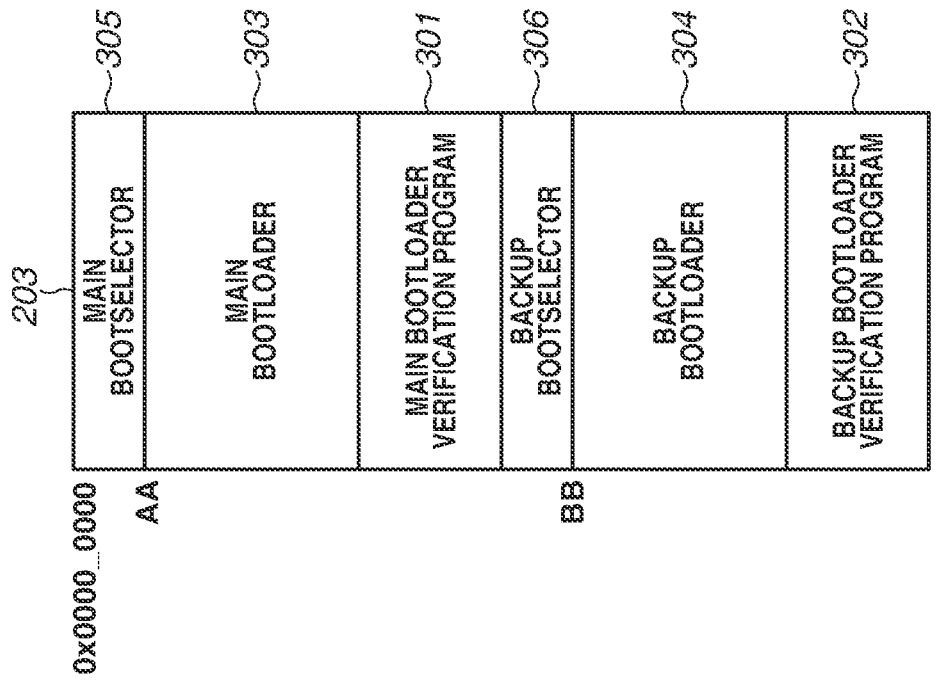
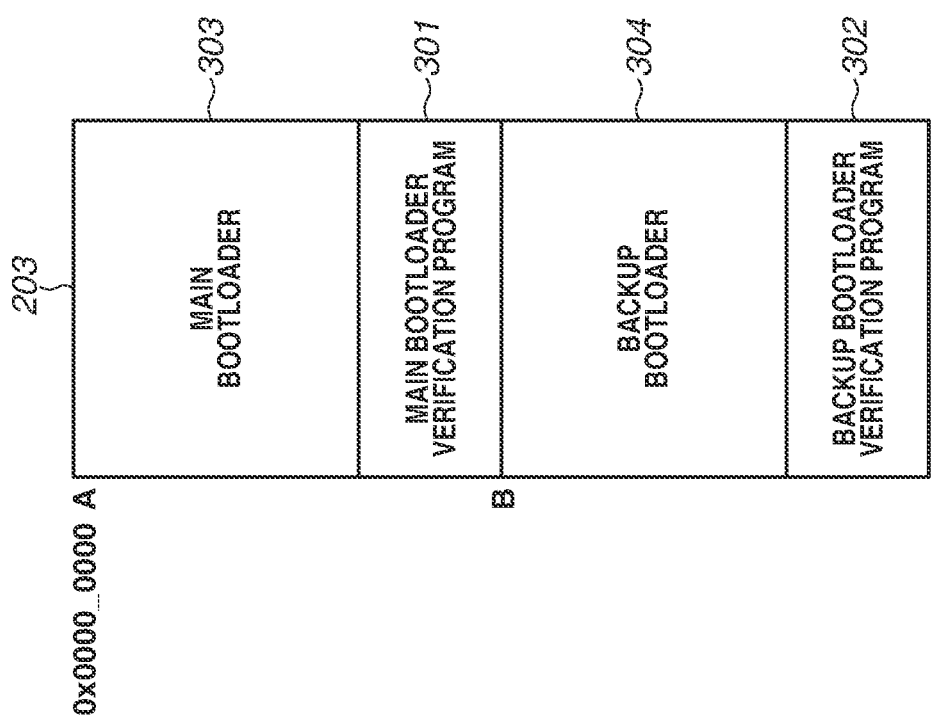

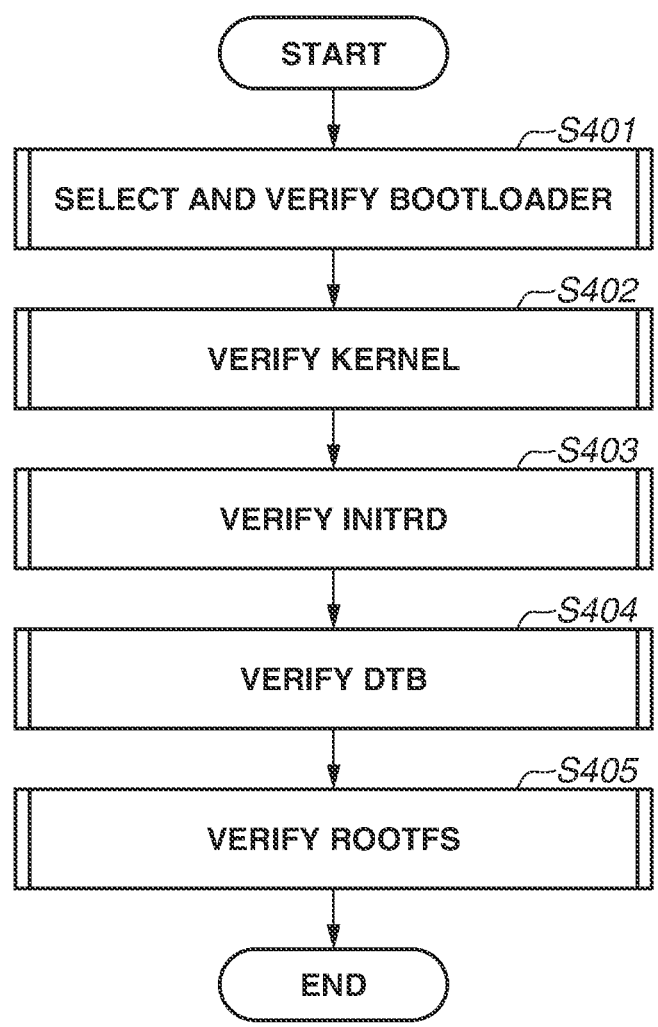

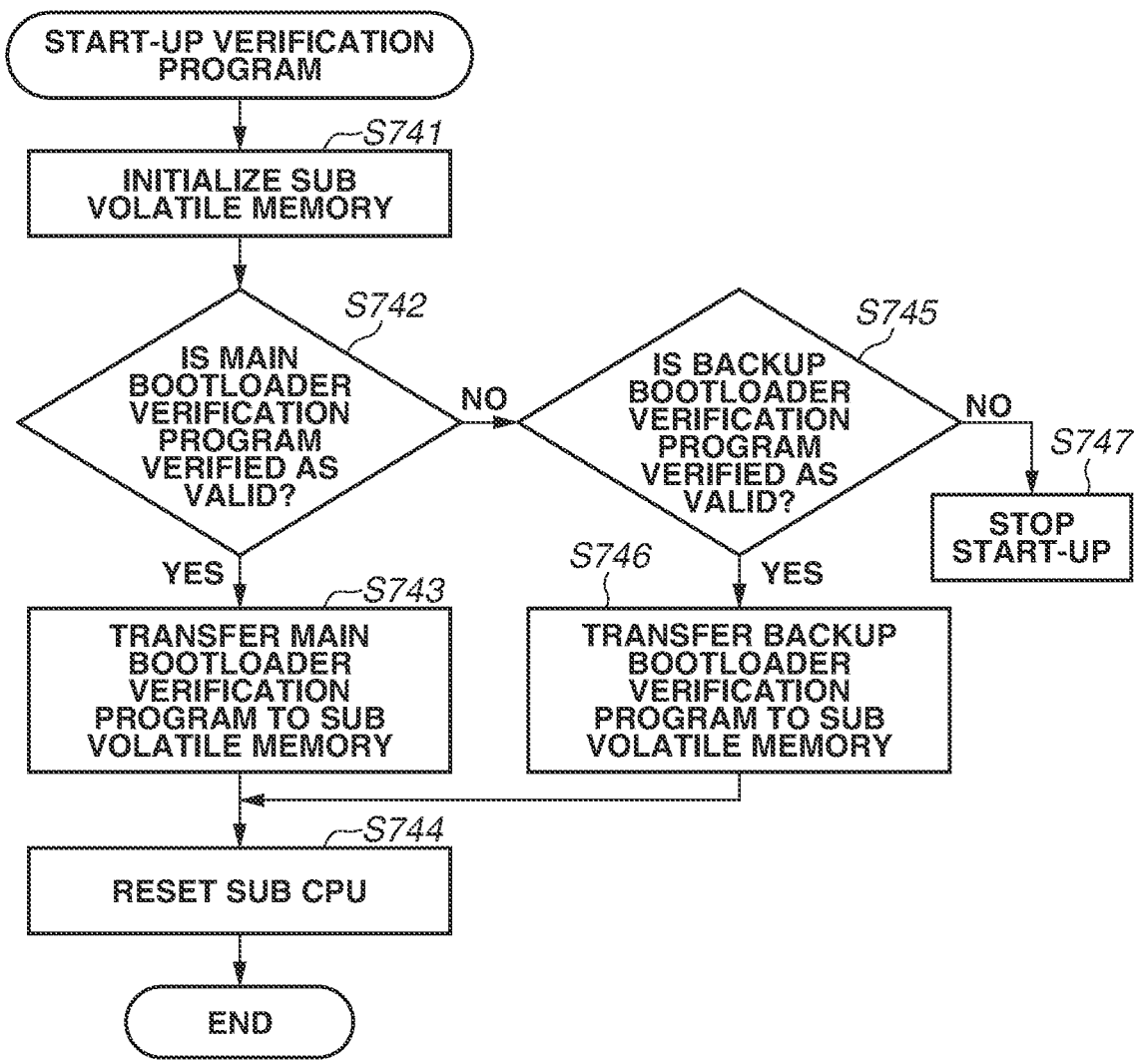

INFORMATION PROCESSING APPARATUS AND METHOD FOR CONTROLLING THE SAME

BACKGROUND

Field

The present disclosure relates to an information processing apparatus and a method for controlling the information processing apparatus.

Description of the Related Art

With the recent development of Internet of Things (IoT), various devices are connected on networks. Thus, the interest of users in security has further increased, and security enhancement in image forming apparatuses has come to be expected. A feature called Secure Boot for performing program verification at start-up is widely known as one such security feature.

The Secure Boot feature is implemented based on concepts referred to as Root of Trust (RoT) and Chain of Trust (CoT). The RoT refers to a hardware or software component implemented by hardware or protected by hardware, and designed to be secure against attacks from outside. Using the RoT as a starting point, a program to be started next is verified, and only programs determined to be valid as a result of verification are sequentially started, so that the CoT is formed.

An image forming apparatus uses an embedded controller (EC) or the like as the RoT. The CoT is formed by a procedure in which the EC verifies a basic input/output system (BIOS) or a bootloader, the BIOS or the bootloader verifies a kernel or an initrd, and the kernel or the initrd verifies a rootfs, so that the Secure Boot feature is implemented. There is also an image forming apparatus having an automatic restoration function of restoring a program by overwriting the program with a backup program in a case where the program is determined to be invalid as a result of verification in the above-described processing.

In a case where a program is held as a backup for the above-described automatic restoration function, double programs, i.e., a main program and a backup program are to be maintained. In a case where both of the programs are verified, the verification time doubles. Thus, conventionally, the backup program is verified only when the main program is determined to be invalid as a result of verification and the restoration is necessary. If the backup program is verified only when the restoration is necessary, there is a possibility that the backup program can be invalid or damaged.

In view of this, a configuration is provided in which a program to be used for start-up is randomly selected at each start-up, based on a criterion such as any random number value. According to the above-described system, one of the main program and the backup program is verified at one start-up, and thus the start-up time is reduced compared with a case where both of the programs are verified. Further, because of a plurality of times of start-up, each of the main program and the backup program is randomly selected as a start-up target, so that the backup program can be verified albeit irregularly.

Meanwhile, a system discussed in Japanese Patent Application Laid-Open No. 2003-288213 has a configuration where, even in a case where update processing for updating a bootloader has not been successfully completed, the system starts from an area in which a jump command is stored at the time of reset. Accordingly, the system starts from a temporary bootloader different from the bootloader. In other words, in a case where the update processing has not been successfully completed, the system starts from the temporary bootloader, i.e., only when the restoration is necessary, a backup program can be executed. For this reason, if the restoration is necessary, there is a possibility that the backup program can be invalid or damaged.

SUMMARY

According to one embodiment of the present disclosure, an information processing apparatus includes a nonvolatile memory configured to store a selection program for selecting a program to be executed, a first boot program for starting up a main system of the information processing apparatus, a verification program for verifying a boot program, and a second boot program that is a backup of the first boot program, in this order. The information processing apparatus also includes a first volatile memory, a second volatile memory different from the first volatile memory, a first processor configured to, before executing the first boot program or the second boot program, execute a program stored in the nonvolatile memory without loading the program into the first volatile memory, and a second processor configured to load the verification program into the second volatile memory and execute the verification program. The second processor verifies validity of at least the first boot program using the verification program. The first processor executes the selection program to select a boot program verified as valid by the second processor, and executes the selected boot program.

Further features of the present disclosure will become apparent from the following description of example embodiments with reference to the attached drawings.

BRIEF DESCRIPTION OF THE DRAWINGS

FIGS. 4A and 4B are diagrams illustrating, respectively, a conventional program arrangement of a nonvolatile memory and a program arrangement of the nonvolatile memory according to an example embodiment of the present disclosure.

FIG. 5 is a flowchart illustrating start-up processing according to one embodiment.

FIGS. 6A to 6D are flowcharts each illustrating processing according to one embodiment.

DESCRIPTION OF THE EMBODIMENTS

Example embodiments of the present disclosure will be described in detail below with reference to the attached drawings. The following example embodiments are not intended to limit the present disclosure according to the claims, and not all combinations of features described in the example embodiments are essential to each embodiment of solving means of the present disclosure. The example embodiments will be described using an image processing apparatus as an example of an information processing apparatus, but are not limited thereto.

Figure 1:
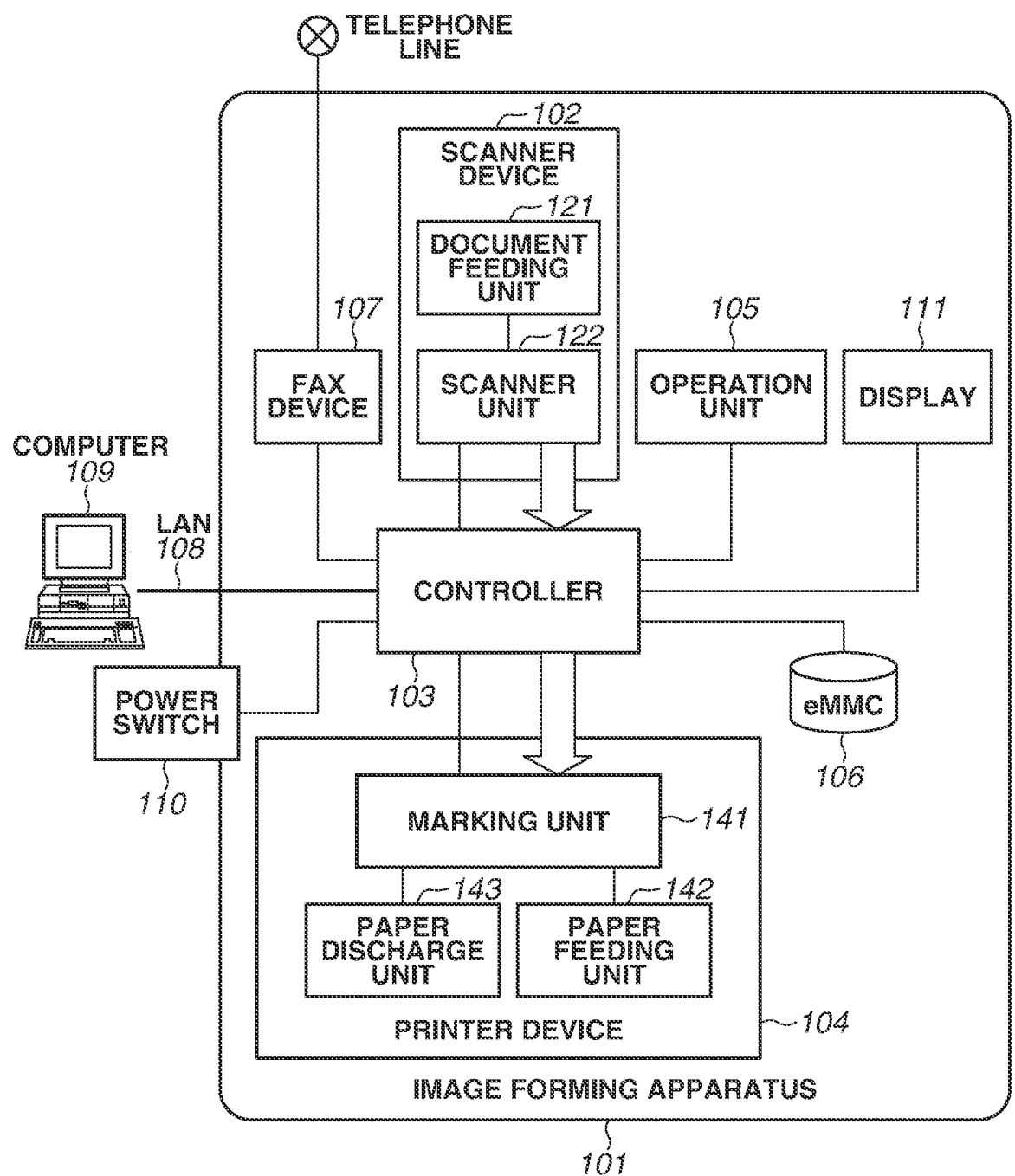
FIG. 1 is a block diagram illustrating an image forming apparatus according to one embodiment.

An image forming apparatus will be described as an example of an information processing apparatus according to an example embodiment of the present disclosure. FIG. 1 is a block diagram illustrating a configuration of an electrophotographic copier (hereinafter referred to as an image forming apparatus) 101. In the present example embodiment, a multifunction peripheral including a print function, a scan function, and a data communication function is used as an example of the image forming apparatus 101.

Referring to FIG. 1, the image forming apparatus 101 is configured to receive a job from a computer 109 via a local area network (LAN) 108. The number of computers connected to the image forming apparatus 101 may be one or more. A scanner device 102 optically reads an image from a document and converts the read image into a digital image. A printer device 104 outputs a digital image to a paper device called a sheet. An operation unit 105 includes a touch panel and hardware keys for accepting settings for the image forming apparatus 101 from a user. The operation unit 105 further includes a processing unit independent of a controller 103 to be described below. A display 111 displays an operation state of the image forming apparatus 101. In a case where the operation unit 105 is a touch panel, the operation unit 105 is in a form of being mounted on a front surface of the display 111. An embedded multimedia card (eMMC) 106 stores digital images, a control program, and the like. eMMC is a trademark of Joint Electron Device Engineering Council (JEDEC)/MultiMediaCard Association (MMCA).

While the eMMC 106 is illustrated in FIG. 1, a large-capacity nonvolatile storage device such as a hard disk drive (HDD) or a solid state drive (SSD) may be used alternatively. A facsimile (fax) device 107 transmits and receives a digital image to and from a telephone line or the like. The controller 103 is connected to the scanner device 102, the printer device 104, the operation unit 105, the eMMC 106, the fax device 107, and the display 111, and executes a job on the image forming apparatus 101 by providing an instruction to each of the modules.

The image forming apparatus 101 can also input and output a digital image to and from the computer 109 via the LAN 108, issue a job, and provide an instruction to a device. The scanner device 102 includes a document feeding unit 121 capable of automatically feeding documents one by one from a document bundle, and a scanner unit 122 capable of optically scanning the fed document and converting the scanned document into a digital image. Further, image data obtained by the conversion is transmitted to the controller 103.

The printer device 104 includes a paper feeding unit 142 capable of feeding sheets one by one from a sheet bundle, a marking unit 141 for printing image data on the fed sheet, and a paper discharge unit 143 for discharging the sheet subjected to the printing.

The image forming apparatus 101 further includes a power switch 110 connected to the controller 103. While the power switch 110 is on, at least the operation unit 105 and a part of a main board of the controller 103 are supplied with power. Even if the power switch 110 is turned off, the power supply is not immediately stopped. The power supply to parts other than a part, such as a part of a power control unit, for turning on the power switch 110 is stopped after software or hardware end processing is completed.

<Functions of System>

An example of jobs (functions) that can be executed by the image forming apparatus 101 will be described next.

[Copy Function]

The image forming apparatus 101 has a copy function of recording an image read by the scanner device 102 into the eMMC 106 and simultaneously printing the image using the printer device 104.

[Image Transmission Function]

The image forming apparatus 101 has an image transmission function of transmitting an image read by the scanner device 102 to the computer 109 via the LAN 108.

[Image Saving Function]

The image forming apparatus 101 has an image saving function of recording an image read by the scanner device 102 into the eMMC 106 to transmit and/or print the image as appropriate.

[Image Printing Function]

The image forming apparatus 101 has an image printing function of analyzing, for example, a page-description language transmitted from the computer 109, and performing printing using the printer device 104.

<Configuration of Operation Unit>

The operation unit 105, which is connected to the controller 103, includes a liquid crystal display (LCD) touch panel, a power saving button, a copy button, a cancel button, a reset button, a numeric keypad, and a user mode key, and provides a user interface (I/F) for operating an image input/output system.

Figure 2:
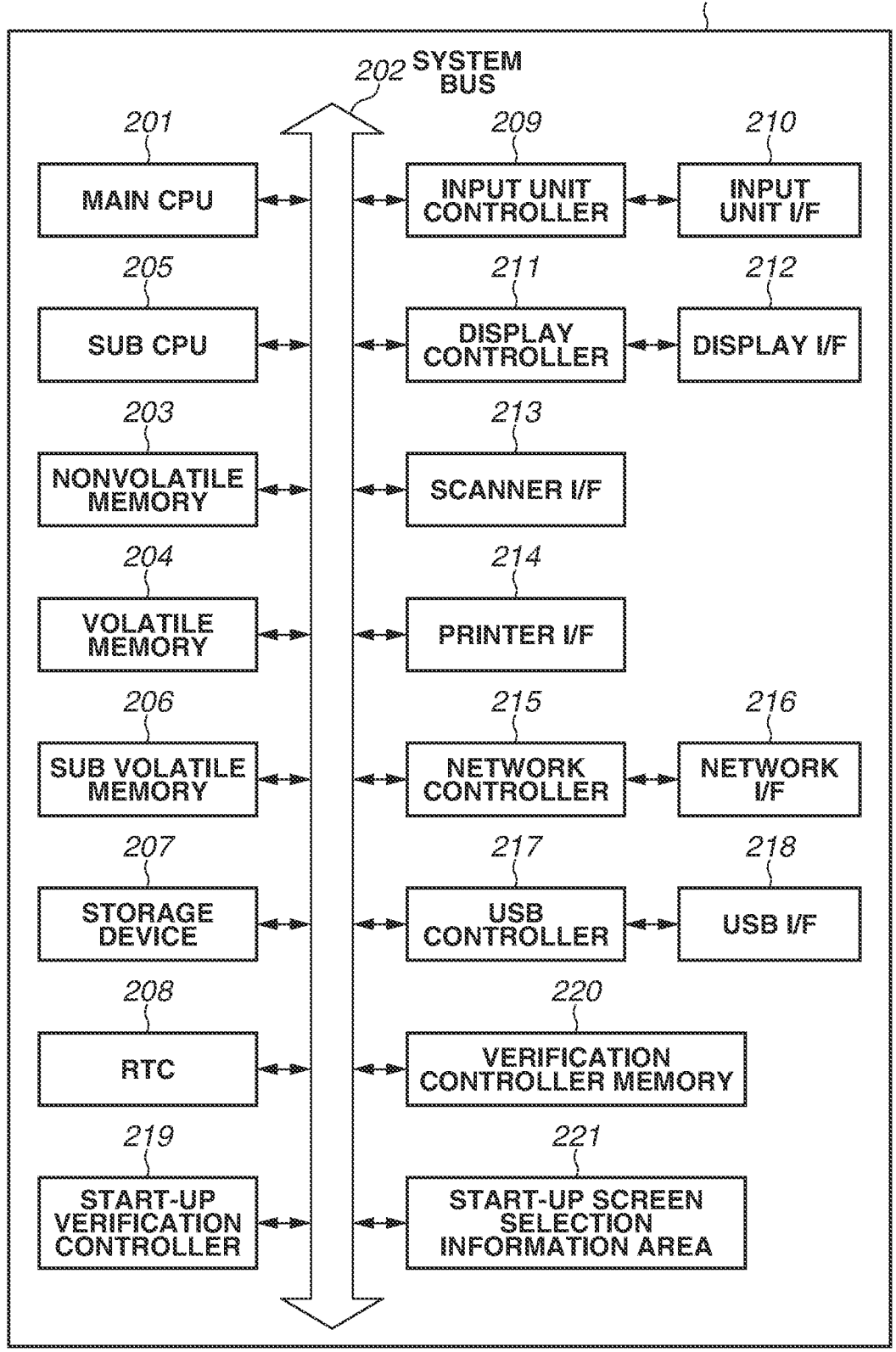
FIG. 2 is a block diagram illustrating a controller board according to one embodiment.

FIG. 2 is a hardware block diagram illustrating the controller 103 of the image forming apparatus 101. A configuration of the controller 103 of the image forming apparatus 101 will be described with reference to FIG. 2.

A main central processing unit (CPU) 201 is a central processing unit of a control device that runs a program for operating the image forming apparatus 101. The main CPU 201 executes a program loaded from a nonvolatile memory 203 or a storage device 207 into a volatile memory 204. Examples of the nonvolatile memory 203 include a serial peripheral interface (SPI) flash, and examples of the storage device 207 include an eMMC.

A system bus 202 is a path for the main CPU 201 to access the other units and for the other units to access each other.

A sub CPU 205 is a central processing unit of a control device that functions to monitor an interruption from each piece of hardware and wake up the main CPU 201 if an interruption occurs while the image forming apparatus 101 is in a power saving mode. In the present example embodiment, the sub CPU 205 is also used for program verification at start-up.

In the present example embodiment, a sub volatile memory 206 is used by the sub CPU 205 in order to load a program for program verification at start-up from the nonvolatile memory 203 into the sub volatile memory 206 and executes the program.

A network controller 215 performs communication between the image forming apparatus 101 and another apparatus on a network via a network I/F 216.

A Universal Serial Bus (USB) controller 217 controls communication between the image forming apparatus 101 and a USB device via a USB I/F 218. While one USB I/F 218 is illustrated in FIG. 2, one or more USB I/Fs 218 may be provided.

A display controller 211 controls display on the display 111 via a display I/F 212. An input unit controller 209 communicates with the operation unit 105 that accepts an instruction given by the user to the image forming apparatus 101, via an input unit I/F 210. A real time clock (RTC) 208 has a clock function, an alarm function, and a timer function of the image forming apparatus 101.

The scanner device 102 is connected to the image forming apparatus 101 via the system bus 202 and a scanner IF 213.

The printer device 104 is connected to the image forming apparatus 101 via the system bus 202 and a printer I/F 214.

A start-up verification controller 219 is a processing unit that includes a CPU and operates first at the time of power-on. The start-up verification controller 219 performs processing for verifying a program in the nonvolatile memory 203, based on a verification program, a key, and address information that are stored in a verification controller memory 220. The verification controller memory 220 is a nonvolatile memory.

A start-up screen selection information area 221 can be referred to by both of the main CPU 201 and the sub CPU 205, and is used to store information indicating which one of a main bootloader 303 and a backup bootloader 304 to be escribed below is to be used for start-up. The start-up screen selection information area 221 is a nonvolatile memory.

Figure 3:
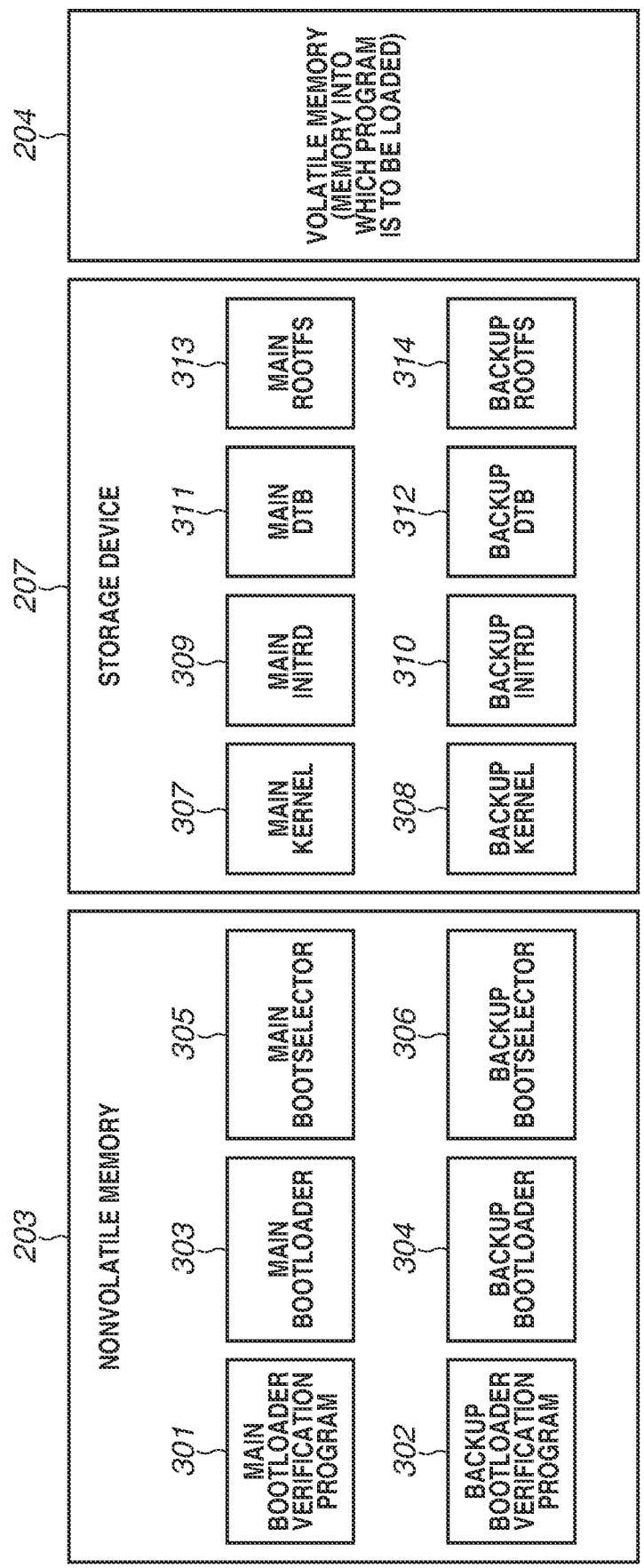
FIG. 3 is a block diagram illustrating programs according to one embodiment.

FIG. 3 is a block diagram illustrating programs that are targets for an automatic restoration function in the present example embodiment. A program configuration according to the present example embodiment will be described with reference to FIG. 3.

A main bootloader verification program 301 is a program for verifying the main bootloader 303 or the backup bootloader 304. A backup bootloader verification program 302 is a copy of the main bootloader verification program 301.

The main bootloader 303 is a boot program for starting up a main system of the image forming apparatus 101. The main bootloader 303 verifies a main kernel 307, a main initrd 309, and a main dtb 311. The main bootloader 303 also verifies a backup kernel 308, a backup initrd 310, and a backup dtb 312 as appropriate, and also performs processing such as initialization processing on each piece of hardware. The backup bootloader 304 is a copy of the main bootloader 303.

A main bootselector 305 is a selection program for selecting a boot program. The main bootselector 305 is placed at a head address of the nonvolatile memory 203. When reset of the main CPU 201 is canceled, processing starts from the main bootselector 305.

The main bootselector 305 is a program that executes a command to jump to the head address of the main bootloader 303 or the backup bootloader 304, based on the information stored in the start-up screen selection information area 221. A backup bootselector 306 is a copy of the main bootselector 305.

The main kernel 307 manages and executes a program of a main rootfs 313 or a backup rootfs 314 to be loaded into the volatile memory 204. The backup kernel 308 is a copy of the main kernel 307. The main initrd 309 is an initial rootfs to be used as a step before loading the main rootfs 313 into the volatile memory 204. The backup initrd 310 is a copy of the main initrd 309. Information such as setting information about each piece of hardware to be used by the main kernel 307 and the backup kernel 308 is described in the main dtb 311. The backup dtb 312 is a copy of the main dtb 311. The main rootfs 313 is a program for implementing main functions of the image forming apparatus 101, such as a copy function, a print function, and a scan function. The backup rootfs 314 is a copy of the main rootfs 313.

FIG. 4A illustrates a conventional configuration representing a conventional program arrangement of the nonvolatile memory 203. FIG. 4B illustrates a configuration representing a program arrangement of the nonvolatile memory 203 according to the present example embodiment. The conventional configuration in which an issue arises and the configuration according to the present example embodiment will be described with reference to FIGS. 4A and 4B.

FIG. 4A illustrates the conventional configuration representing the conventional program arrangement of the nonvolatile memory 203. In the conventional configuration, the programs are stored in the following order, starting from the head address of the nonvolatile memory 203: the main bootloader 303, the main bootloader verification program 301, the backup bootloader 304, and the backup bootloader verification program 302. When the reset of the main CPU 201 is canceled, the programs are executed from the head address 0x0000_0000 defined by the main CPU 201 and thus, in the conventional configuration, start-up can be performed only from a head address A of the main bootloader 303. For this reason, start-up cannot be performed from a head address B of the backup bootloader 304, and thus an embodiment of the disclosure in which a program to be used for start-up is randomly selected at each start-up based on a criterion such as any random number value is not applicable to the conventional configuration.

FIG. 4B illustrates the configuration representing the program arrangement of the nonvolatile memory 203 according to the present example embodiment. FIG. 4B is different from FIG. 4A in that the main bootselector 305 is provided before the main bootloader 303 and the backup bootselector 306 is provided before the backup bootloader 304.

More specifically, the main programs are arranged in the following order, starting from the head address 0x0000_0000: the main bootselector 305, the main bootloader 303, and the main bootloader verification program 301. The backup programs are arranged in the following order, starting from the head: the backup bootselector 306, the backup bootloader 304, and the backup bootloader verification program 302.

When the reset of the main CPU 201 is canceled, the main bootselector 305 located at the head address 0x0000_0000 of the nonvolatile memory 203 is executed first. The main bootselector 305 is provided with a command to jump to a head address AA of the main bootloader 303 or a head address BB of the backup bootloader 304 depending on the condition. Thus, an embodiment of the present disclosure in which a program to be used for start-up is randomly selected at each start-up based on a criterion such as any random number value, which is not applicable to the conventional configuration, is applicable to the configuration according to the present example embodiment.

In a case where the main bootselector 305 is invalid, the backup bootselector 306 is read out by the sub CPU 205 and used to overwrite the main bootselector 305. Details thereof will be described with reference to FIGS. 6A to 6D.

FIG. 5 is a flowchart illustrating an outline of start-up processing for starting up the image forming apparatus 101. The start-up processing will be described with reference to FIG. 5.

Figure 6B:
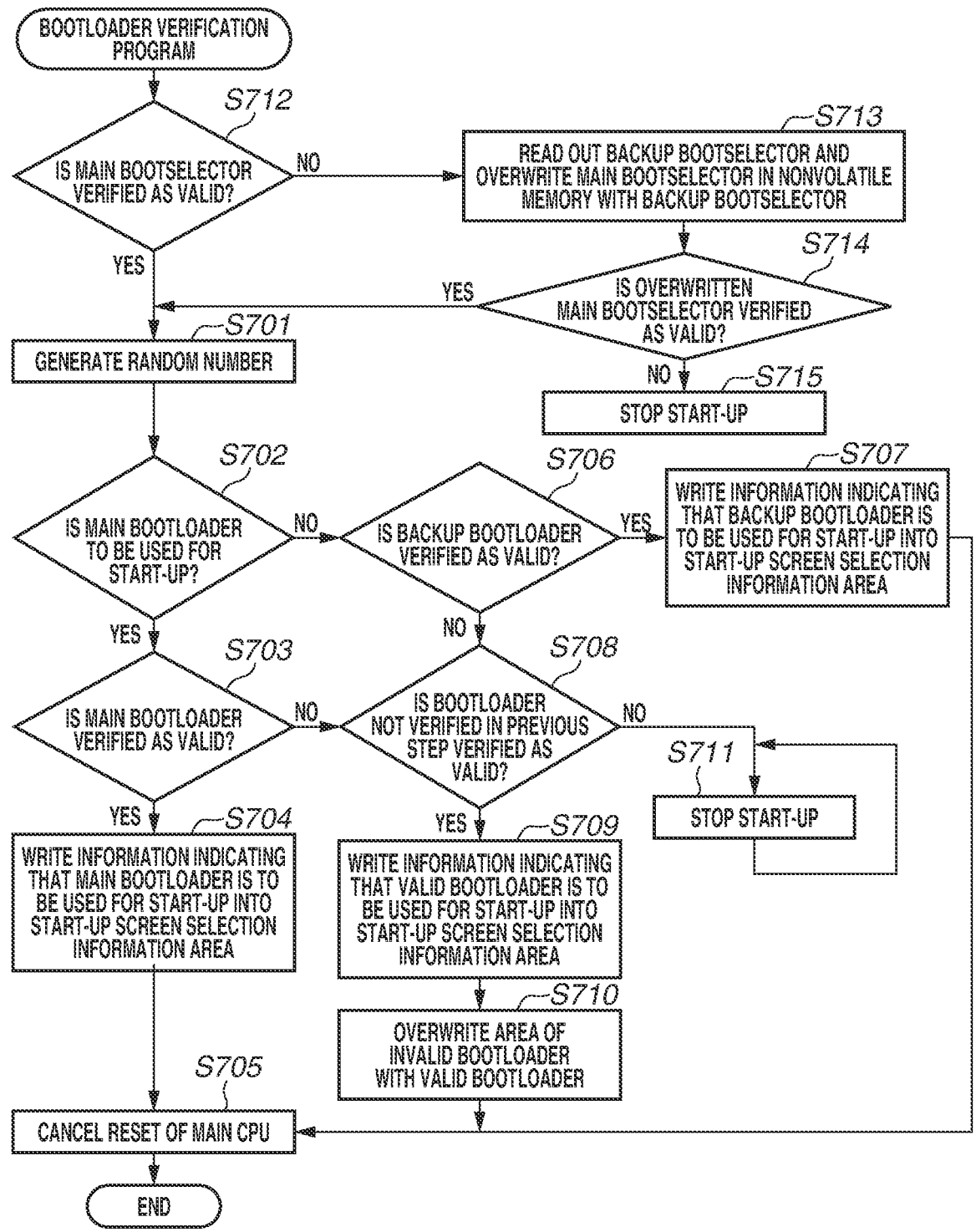

In step S401, bootloader verification and selection processing is performed. More specifically, four types of processing illustrated in FIGS. 6A to 6D are performed. A specific configuration of each processing is illustrated in FIGS. 6A to 6D. First, in step S401, processing in FIG. 6A is executed.

FIG. 6A is a flowchart in which the start-up verification controller 219 executes a program in the verification controller memory 220 upon power-on.

In step S741, the start-up verification controller 219 initializes the sub volatile memory 206.

In step S742, the start-up verification controller 219 verifies validity of the main bootloader verification program 301 stored in the nonvolatile memory 203.

In a case where the main bootloader verification program 301 is determined to be invalid (NO in step S742), the processing proceeds to step S745. In step S745, the start-up verification controller 219 verifies validity of the backup bootloader verification program 302 stored in the nonvolatile memory 203.

In a case where the backup bootloader verification program 302 is determined to be invalid (NO in step S745), the processing proceeds to step S747. In step S747, the start-up of the image forming apparatus 101 stops.

Returning to the description of step S742, in a case where the main bootloader verification program 301 is determined to be valid (YES in step S742), the processing proceeds to step S743. In step S743, the start-up verification controller 219 transfers the main bootloader verification program 301 to the sub volatile memory 206. Subsequently, in step S744, the start-up verification controller 219 resets the sub CPU 205.

Returning to the description of step S745, in a case where the backup bootloader verification program 302 is determined to be valid (YES in step S745), the processing proceeds to step S746. In step S746, the start-up verification controller 219 transfers the backup bootloader verification program 302 to the sub volatile memory 206. Subsequently, the processing proceeds to step S744 described above.

Next, processing in FIG. 6B is executed. FIG. 6B is a flowchart in which the sub CPU 205 reset in step S744 in FIG. 6A executes the main bootloader verification program 301.

When the reset of the sub CPU 205 is canceled, the main bootloader verification program 301 in the nonvolatile memory 203 is loaded into the sub volatile memory 206 and executed, so that the processing in FIG. 6B is started. The sub CPU 205 can load data into the sub volatile memory 206.

First, in step S712, the main bootloader verification program 301 verifies the main bootselector 305. In a case where the main bootselector 305 is determined to be valid as a result of the verification (YES in step S712), the processing proceeds to step S701. Step S701 will be described below. In a case where the main bootselector 305 is determined to be invalid as a result of the verification (NO in step S712), the processing proceeds to step S713. In step S713, the sub CPU 205 reads out the backup bootselector 306 and overwrites the main bootselector 305 in the nonvolatile memory 203 with the backup bootselector 306. Upon completion of the overwriting, the processing proceeds to step S714. In step S714, the sub CPU 205 verifies the overwritten main bootselector 305. In a case where the overwritten main bootselector 305 is determined to be valid as a result of the verification (YES in step S714), the processing proceeds to step S701 to be described below. In a case where the overwritten main bootselector 305 is determined to be invalid as a result of the verification (NO in step S714), the processing proceeds to step S715. In step S715, the main bootloader verification program 301 stops the start-up.

In step S701, the main bootloader verification program 301 generates a random number. Then, in step S702, the main bootloader verification program 301 determines which one of the main bootloader 303 and the backup bootloader 304 is to be used for start-up, based on the random number generated in step S701.

In the present example embodiment, the configuration that determines which one of the main bootloader 303 and the backup bootloader 304 is to be used for start-up based on the random number is described. Alternatively, any other configuration may be adopted. For example, there may be adopted a method of storing information about the bootloader used at the last start-up into the start-up screen selection information area 221 and performing start-up in a way opposite to the last start-up (in such a way that, if the bootloader used at the last start-up is the main bootloader 303, the backup bootloader 304 is determined to be used for the start-up to be performed this time).

In a case where the main bootloader 303 is determined to be used for start-up (YES in step S702), the processing proceeds to step S703. In step S703, the main bootloader verification program 301 verifies the main bootloader 303.

In a case where the main bootloader 303 is determined to be valid in the verification (YES in step S703), the processing proceeds to step S704. In step S704, the main bootloader verification program 301 writes information indicating that the main bootloader 303 is to be used for start-up, into the start-up screen selection information area 221. Then, the processing proceeds to step S705 to be described below.

Returning to the description of step S702, in a case where the backup bootloader 304 is determined to be used for start-up (NO in step S702), the processing proceeds to step S706. In step S706, the main bootloader verification program 301 verifies the backup bootloader 304. In a case where the backup bootloader 304 is determined to be valid in the verification (YES in step S706), the processing proceeds to step S707. In step S707, the main bootloader verification program 301 writes information indicating that the backup bootloader 304 is to be used for start-up, into the start-up screen selection information area 221. Then, the processing proceeds to step S705 to be described below. On the other hand, in a case where the backup bootloader 304 is determined to be invalid in the verification (NO in step S706), the processing proceeds to step S708. Step S708 will be described below.

Returning to the description of step S703, in a case where the main bootloader 303 is determined to be invalid (No in step S703), the processing proceeds to step S708. In step S708, the main bootloader verification program 301 verifies the bootloader not verified in step S703. The bootloader not verified in step S703 is, for example, the backup bootloader 304 in a case where the main bootloader 303 is verified in step S703. The bootloader not verified in step S703 is the main bootloader 303 in a case where the backup bootloader 304 is verified in step S703.

In a case where the bootloader not verified in the previous step is determined to be invalid in the verification (NO in step S708), the processing proceeds to step S711. In step S711, because both of the main bootloader 303 and the backup bootloader 304 are determined to be invalid, the main bootloader verification program 301 stops the start-up.

In a case where the bootloader not verified in the previous step is determined to be valid in the verification (YES in step S708), the processing proceeds to step S709. In step S709, the main bootloader verification program 301 writes information indicating that the bootloader determined to be valid is to be used for start-up, into the start-up screen selection information area 221. Then, in step S710, the main bootloader verification program 301 overwrites the area of the bootloader determined to be invalid in the verification, with the bootloader determined to be valid in the verification. Then, the processing proceeds to step S705.

In step S705, the sub CPU 205 cancels the reset of the main CPU 201.

When the reset of the main CPU 201 is canceled, the main bootselector 305 located at the head address of the nonvolatile memory 203 is read out and executed.

Figure 6C:
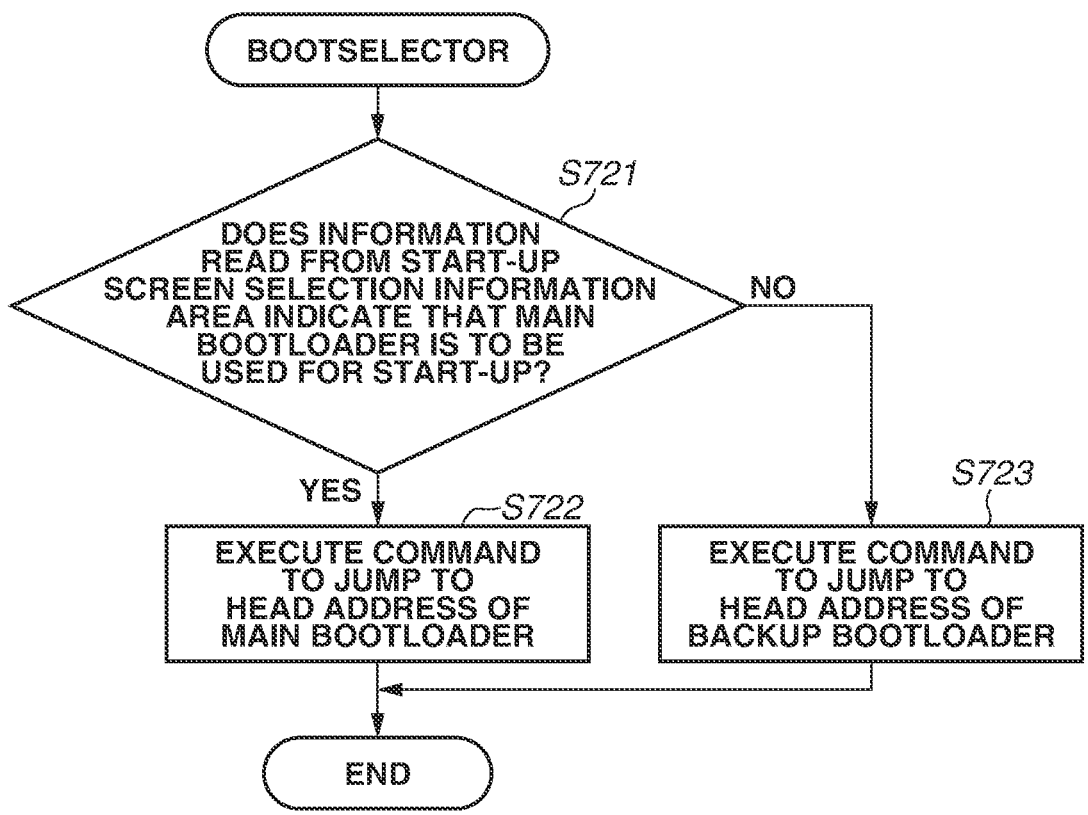
Figure 6D:
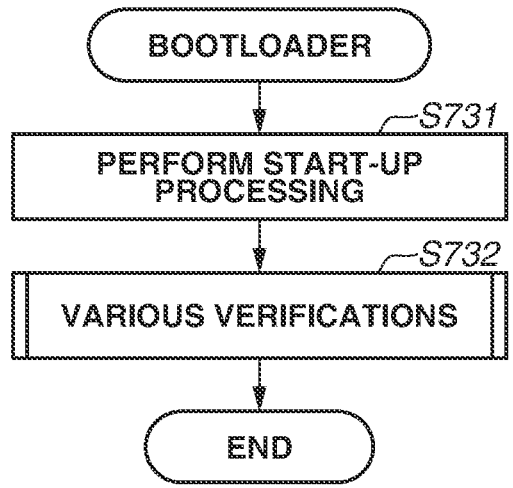

When the reset of the main CPU 201 is canceled, the main CPU 201 executes processing illustrated in each of FIGS. 6C and 6D.

In the flowchart in FIG. 6B, the main bootselector 305 is verified first, but may be verified before step S705.

Next, a flowchart for the main bootselector 305 in FIG. 6C will be described. The main CPU 201 is unable to load a program from the nonvolatile memory 203 into the volatile memory 204 before executing the bootloader. Thus, the main CPU 201 executes a program stored in the ROM before executing the bootloader, and starts the loading from a predetermined start position. The predetermined start position is, for example, the head address "0x0000_0000" illustrated in FIG. 4B.

In FIG. 6C, the main CPU 201 executes the main bootselector 305 stored at the predetermined position.

In step S721, the main bootselector 305 reads out the information stored in the start-up screen selection information area 221. This is to confirm which one of the main bootloader 303 and the backup bootloader 304 is determined to be used for start-up as a result of verification by the main CPU 201 in step S704 or S709.

In a case where the main bootloader 303 is determined to be used for start-up (YES in step S721), the processing proceeds to step S722. In step S722, the main bootselector 305 executes the command to jump to the head address of the main bootloader 303.

In a case where the backup bootloader 304 is determined to be used for start-up (NO in step S721), the processing proceeds to step S723. In step S723, the main bootselector 305 executes the command to jump to the head address of the backup bootloader 304.

In steps S722 and S723, upon jumping to the head address, bootloader processing is started.

FIG. 6D illustrates the bootloader processing. Upon start of the bootloader processing, the main CPU 201 performs start-up processing such as making various register settings.

In step S731, upon start of the bootloader processing, the start-up processing such as making various register settings is performed. Then, in step S732, steps (S402, S403, and S404) of verifying the main kernel 307, the main initrd 309, and the main dtb 311 are performed. The processing transitions to the processing of the main kernel 307 and the main initrd 309 to start up the system.

In step S732, the bootloader initializes each piece of hardware. Subsequently, in a case where the validity is verified and proved in each of steps S402 to S404 illustrated in FIG. 5, the execution is performed. More specifically, in a case where each of the main kernel 307, the main initrd 309, and the main dtb 311 is verified as valid, the main kernel 307, the main initrd 309, and the main dtb 311 are each loaded into the volatile memory 204 in step S405. Then, in step S405, the bootloader switches to the main kernel 307 and the main initrd 309, and the main kernel 307 verifies the main rootfs 313. In a case where the main rootfs 313 is determined to be valid as a result of the verification, the main rootfs 313 is loaded into the volatile memory 204 and executed, so that the system of the image forming apparatus 101 is started up.

In the present example embodiment, processing related to the automatic restoration of the bootloader is extracted and described, but may be accompanied by other processing.

According to the present example embodiment, the frequency of verification of a backup program of a program to be executed on a ROM, such as a bootloader can be increased, and system robustness using an automatic restoration function can be improved.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2022-006224, filed Jan. 19, 2022, which is hereby incorporated by reference herein in its entirety.

What is claimed is:

1. An information processing apparatus comprising:
a nonvolatile memory configured to store a selection program for selecting a program to be executed, a first boot program for starting up a main system of the information processing apparatus, a verification program for verifying a boot program, and a second boot program that is a backup of the first boot program, in this order;
a first volatile memory;
a second volatile memory different from the first volatile memory;
a first processor configured to, before executing the first boot program or the second boot program, execute a program stored in the nonvolatile memory without loading the program into the first volatile memory; and
a second processor configured to load the verification program into the second volatile memory and execute the verification program, wherein the second processor verifies validity of at least the first boot program using the verification program, and wherein the first processor executes the selection program to select a boot program verified as valid by the second processor, and executes the selected boot program, wherein the nonvolatile memory stores the selection program, the first boot program, the verification program, a different selection program that is a backup of the selection program, and the second boot program, in this order, wherein the selection program is stored at a head address of the nonvolatile memory, wherein the selected boot program is the second boot program in a case where the first boot program is invalid and the second boot program is valid.

2. The information processing apparatus according to claim 1, wherein the selected boot program is the first boot program in a case where the first boot program is valid.

3. The information processing apparatus according to claim 1, wherein the second processor verifies validity of the second boot program using the verification program in a case where the first boot program is invalid.

4. The information processing apparatus according to claim 1, further comprising a second nonvolatile memory configured to store a result of the verification using the verification program, wherein the first processor executes the selection program to refer to the result of the verification stored in the second nonvolatile memory and select the first boot program or the second boot program.

5. The information processing apparatus according to claim 1, wherein the selection program is stored at a first address of the nonvolatile memory, and wherein the first processor first executes the selection program stored at the first address of the nonvolatile memory.

6. The information processing apparatus according to claim 1, wherein, before the first processor executes the selection program, the second processor verifies validity of the selection program using the verification program, and overwrites the selection program with the different selection program in a case where the selection program is invalid.

7. The information processing apparatus according to claim 6, wherein, by overwriting the selection program with the different selection program, the second processor verifies validity of the overwritten selection program using the verification program.

8. The information processing apparatus according to claim 7, wherein the first processor executes the overwritten selection program in a case where the overwritten selection program is valid.

9. The information processing apparatus according to claim 1, wherein the second processor resets the first processor in a case where at least one of the first boot program or the second boot program is valid.

10. The information processing apparatus according to claim 1, further comprising:

a third processor different from the first processor and the second processor, and configured to operate at start-up of the information processing apparatus; and a third nonvolatile memory configured to store a different verification program to be executed at the start-up of the information processing apparatus, wherein the third processor verifies validity of the verification program stored in the third nonvolatile memory, based on the start-up of the information processing apparatus, and resets the second processor in a case where the different verification program is valid.

11. The information processing apparatus according to claim 10, wherein the nonvolatile memory stores the selection program, the first boot program, the verification program, a different selection program that is a backup of the selection program, the second boot program, and a verification program that is a backup of the verification program, in this order, and wherein the third processor overwrites the verification program with the backup of the verification program in a case where the verification program is invalid.

12. The information processing apparatus according to claim 11, wherein the third processor verifies validity of the overwritten verification program, and resets the second processor in a case where the overwritten verification program is valid.

13. A method for controlling an information processing apparatus including a nonvolatile memory configured to store a selection program for selecting a program to be executed, a first boot program for starting up a main system of the information processing apparatus, a verification program for verifying a boot program, and a second boot program that is a backup of the first boot program, in this order, a first volatile memory, a second volatile memory different from the first volatile memory, a first processor configured to, before executing the first boot program or the second boot program, execute a program stored in the nonvolatile memory without loading the program into the first volatile memory, and a second processor configured to load the verification program into the second volatile memory and execute the verification program, the method comprising:

causing the second processor to verify validity of at least the first boot program using the verification program; and causing the first processor to execute the selection program to select a boot program verified as valid by the second processor, and execute the selected boot program, wherein the selection program is stored at a head address of the nonvolatile memory, wherein the selected boot program is the second boot program in a case where the first boot program is invalid and the second boot program is valid.

* * * * *